US008634282B2

(12) United States Patent
Kim et al.

(10) Patent No.: US 8,634,282 B2
(45) Date of Patent: Jan. 21, 2014

(54) APPARATUS AND METHOD FOR PROVIDING A TRACKING SERVO CONTROL WHEN REPRODUCING OPTICAL INFORMATION

(75) Inventors: Hak Sun Kim, Gunpo-si (KR); Pil Sang Yoon, Suwon-si (KR); Eui Seok Hwang, Seoul (KR)

(73) Assignee: Maple Vision Technologies Inc., Ottawa (CA)

( * ) Notice: Subject to any disclaimer, the term of this patent is extended or adjusted under 35 U.S.C. 154(b) by 637 days.

(21) Appl. No.: 11/688,492

(22) Filed: Mar. 20, 2007

(65) Prior Publication Data

US 2007/0237042 A1    Oct. 11, 2007

(30) Foreign Application Priority Data

Apr. 6, 2006 (KR) .................. 10-2006-0031303
Sep. 25, 2006 (KR) .................. 10-2006-0092892

(51) Int. Cl.
  *G11B 7/09* (2006.01)
  *G11B 7/0065* (2006.01)
(52) U.S. Cl.
  USPC ... 369/44.24; 369/102; 369/103; 369/112.17; 369/112.29
(58) Field of Classification Search
  USPC ........................................... 369/102
  See application file for complete search history.

(56) References Cited

U.S. PATENT DOCUMENTS

| 4,682,315 A * | 7/1987 | Uejima ............... 369/44.24 |
| 5,126,988 A * | 6/1992 | Nishiguma et al. ...... 369/44.41 |
| 5,485,440 A * | 1/1996 | Ogino ............... 369/44.34 |
| 5,933,397 A * | 8/1999 | Yamashita et al. ....... 369/44.28 |
| 6,563,779 B1 | 5/2003 | McDonald et al. |
| 2003/0227838 A1 * | 12/2003 | Fujimoto ............. 369/44.26 |
| 2005/0185231 A1 * | 8/2005 | Chuang .................. 359/3 |
| 2005/0199778 A1 * | 9/2005 | Kadowaki et al. ....... 250/201.5 |
| 2006/0153044 A1 * | 7/2006 | Hayashi et al. .......... 369/103 |

FOREIGN PATENT DOCUMENTS

| EP | 1594127 A | 11/2003 |
| EP | 1526517 A | 4/2005 |
| JP | 2005-129196 | 5/2005 |

(Continued)

OTHER PUBLICATIONS

European Search Report dated Jan. 14, 2008.

(Continued)

*Primary Examiner* — Hoa T Nguyen
*Assistant Examiner* — Mark Fischer
(74) *Attorney, Agent, or Firm* — Venable LLP; Robert S. Babayi

(57) ABSTRACT

An optical information reproducing apparatus and an optical information reproducing method using the same are provided. The optical information reproducing apparatus includes: a reference beam providing unit which inputs a reference beam to a reproduction recording area to be reproduced and a peripheral recording area around the reproduction recording area on an optical information recording medium, a peripheral beam detecting unit which transmits a reproduction beam reproduced from the reproduction recording area in response to the reference beam and detects a peripheral beam reproduced from the peripheral recording area, a tracking servo unit which analyzes optical information of the detected peripheral beam and controls a tracking position, and a reproduction beam detecting unit which detects the reproduction beam having pass through the peripheral beam detecting unit. Accordingly, it is possible to judge a current tracking state using the peripheral beam and to perform a tracking servo control process using the judgment result at the time of reproducing optical information.

6 Claims, 12 Drawing Sheets

(56) References Cited

FOREIGN PATENT DOCUMENTS

| JP | 2005-267768 | 9/2005 |
| TW | 200306548 | 11/2003 |
| TW | 594706 | 6/2004 |
| TW | 200411649 | 7/2004 |
| TW | I227884 | 2/2005 |

OTHER PUBLICATIONS

Corresponding TW Office Action.

* cited by examiner

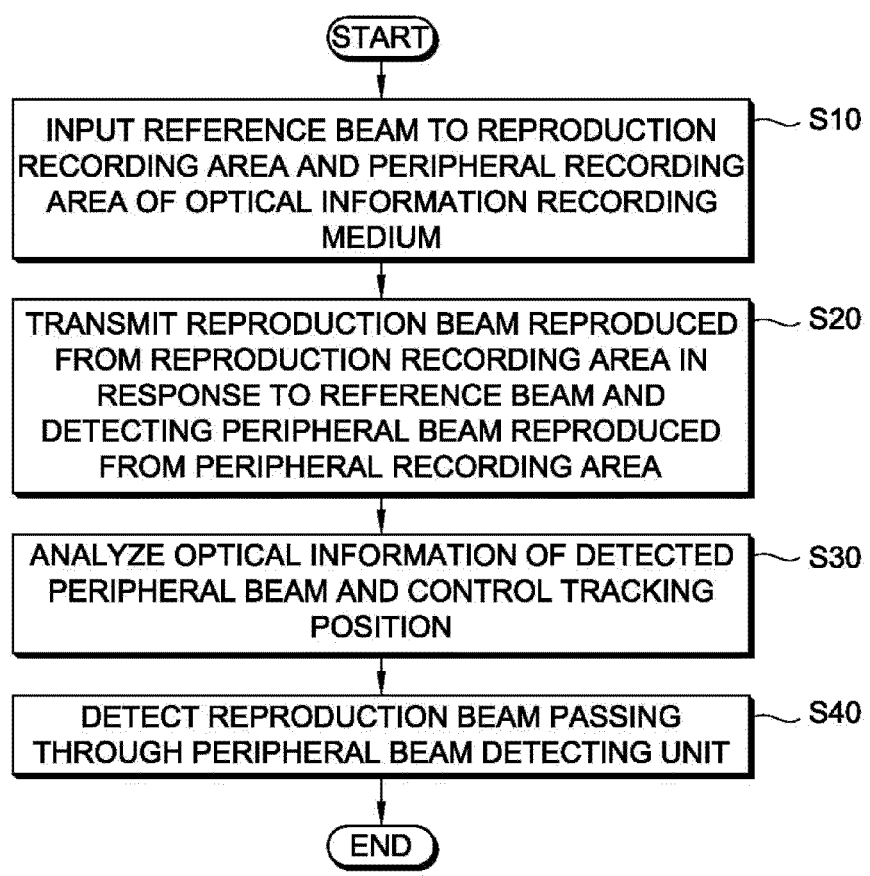

APPARATUS AND METHOD FOR PROVIDING A TRACKING SERVO CONTROL WHEN REPRODUCING OPTICAL INFORMATION

BACKGROUND

1. Technical Field

The present invention relates to an optical information reproducing apparatus and an optical information reproducing method using the same, and more particularly, to an optical information reproducing apparatus which can control a tracking position using optical information of a peripheral beam adjacent to a reproduction beam to be reproduced at the time of reproducing optical information, and an optical information reproducing method.

2. Background Art

Generally, as an optical data recording device for storing optical information, a compact disc (CD), a digital versatile disc (DVD), a high-definition DVD (HD-DVD), and a blu-ray disc (BD) are known.

With recent rapid development of information and computer industries, there is a need for a next-generation storage system which can satisfy a large storage capacity and high-speed data input and output ability.

One of systems having attracted an attention to satisfy the need is an optical information processing system using a principle of volume holography, that is, a holographic optical information processing system.

The holographic optical information processing system is contrived in consideration of a principle that two beams having different incident angles are intersected at a predetermined position on a photosensitive medium sensitive to beam to record an interference pattern, which is formed by means of interference of two beams, in the photosensitive medium.

That is, an interference pattern, which is formed by allowing a signal beam including data information and a reference beam irradiated at an angle different from that of the signal beam to intersect each other at a predetermined position on an optical information recording medium which is a photosensitive medium, is recorded on the optical information recording medium. At the time of reproducing optical information, the original data are restored using a diffracted image generated from the interference pattern by irradiating only a reference beam to the recorded interference pattern.

The holographic optical information processing system can repeatedly record data at the same position of an optical information recording medium in a three-dimensional manner by the use of a variety of multiplexing methods. By employing such a repeated recording process, it is possible to markedly enhance the storage capacity of an optical information recording medium having a limited area, thereby embodying a super large capacity storage system.

Examples of the multiplexing methods can include an angle multiplexing method, a phase-code multiplexing method, a wavelength multiplexing method, a fractal multiplexing method, a shift multiplexing method, a peristrophic multiplexing method, and a polytopic multiplexing method.

The holographic optical information processing system has been studied so as to enhance a data recording density by appropriately using the multiplexing methods. For example, the holographic optical information processing system operates such that the density of a signal beam is enhanced at the time of recording data and a reproduction beam to be reproduced is transmitted and the other peripheral beam is blocked by a beam splitter having a through hole formed therein.

However, such a holographic optical information processing system is sensitive to an environment variation such as a shaking of an apparatus, because the reproduction beam is allowed to pass through the through hole of the beam splitter.

Therefore, an accurate tracking servo control process is required. That is, there is required a process of checking whether a reproduction beam is accurately detected from a desired track and correctly positioning the track through a servo control process when the track is not correctly positioned.

When the tracking servo control process is not properly performed, the reproduction beam to be reproduced does not pass through a slot and a beam detector cannot acquire a correct image of optical information, thereby causing an increase in error rate. Accordingly, there is a great need for a technology of accurately and efficiently performing a tracking control process at the time of reproducing holographic optical information.

SUMMARY

The present invention is contrived to solve the above-mentioned problem. A first advantage of some aspects of the invention is to provide an optical information reproducing apparatus which can reproduce accurate optical information by performing an efficient tracking servo control process using optical information of a peripheral beam at the time of reproducing the optical information.

A second advantage of some aspects of the invention is to provide a tracking servo controller of an optical information reproducing apparatus which can detect tracking servo control information using optical information of a peripheral beam at the time of reproducing the optical information.

A third advantage of some aspects of the invention is to provide an optical information reproducing method which can control a tracking position using optical information of a peripheral beam at the time of reproducing optical information.

According to an aspect of the invention, there is provided an optical information reproducing apparatus including: a reference beam providing unit which inputs a reference beam to a reproduction recording area to be reproduced and a peripheral recording area around the reproduction recording area on an optical information recording medium, a peripheral beam detecting unit which transmits a reproduction beam reproduced from the reproduction recording area in response to the reference beam and detects a peripheral beam reproduced from the peripheral recording area, a tracking servo unit which analyzes optical information of the detected peripheral beam and controls a tracking position, and a reproduction beam detecting unit which detects the reproduction beam having pass through the peripheral beam detecting unit.

According to another aspect of the invention, there is provided an optical information reproducing method including the steps of: inputting a reference beam to a reproduction recording area to be reproduced and a peripheral recording area around the reproduction recording area on an optical information recording medium, transmitting a reproduction beam reproduced from the reproduction recording area in response to the reference beam and detecting a peripheral beam reproduced from the peripheral recording area, analyzing optical information of the detected peripheral beam and controlling a tracking position, and detecting the reproduction beam having pass through the peripheral beam detecting unit.

BRIEF DESCRIPTION OF THE DRAWINGS

FIG. 12 is a flowchart illustrating an optical information reproducing method according to an exemplary embodiment of the invention.

DESCRIPTION OF EXEMPLARY EMBODIMENTS

Hereinafter, an optical information reproducing apparatus and an optical information reproducing method using the same according to some exemplary embodiments of the invention will be described in detail with reference to the attached drawings.

Figure 1:
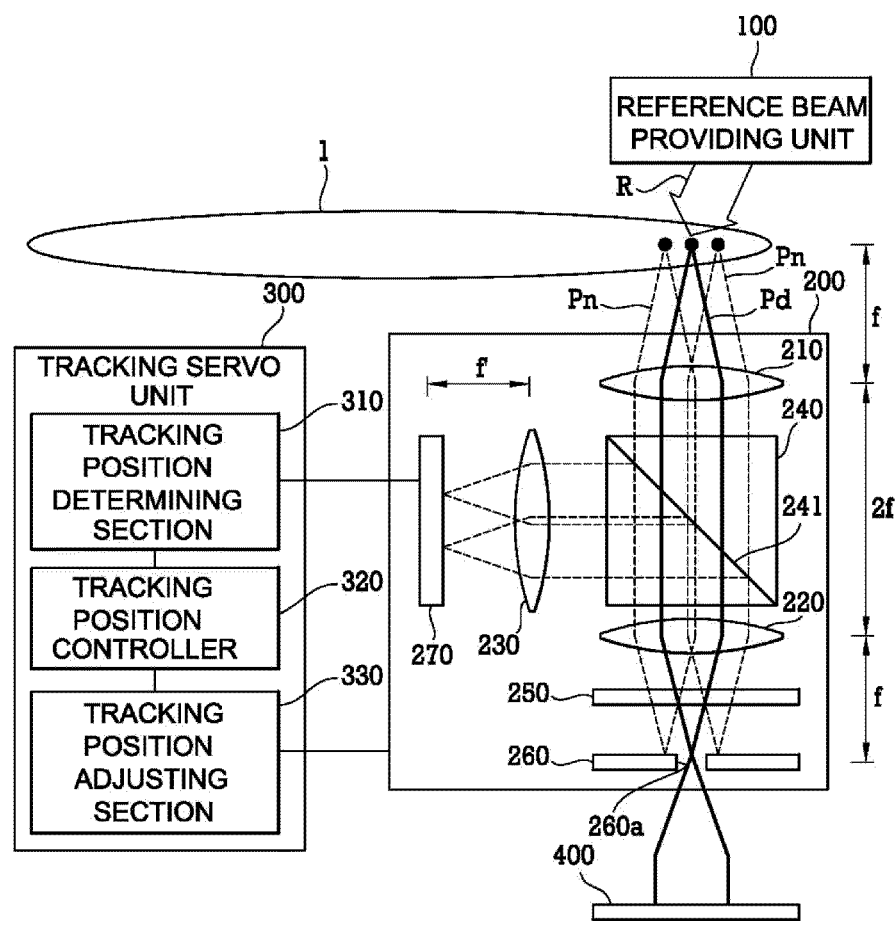
FIG. 1 is a diagram schematically illustrating a configuration of an optical information reproducing apparatus according to an exemplary embodiment of the present invention.

FIG. 1 is a diagram schematically illustrating a configuration of an optical information reproducing apparatus according to an exemplary embodiment of the invention.

An example of the optical information reproducing apparatus will be described with reference to FIG. 1. As shown in the figure, the optical information reproducing apparatus includes a reference beam providing unit 100, a peripheral beam detecting unit 200, a tracking servo unit 300, and a reproduction beam detecting unit 400.

An optical information recording medium 1 in which optical information is recorded has a disc shape. A plurality of spots which are multiplexed and recorded exist in the optical information recording medium 1. The respective spots mean a recording region in which optical information is recorded.

The reference beam providing unit 100 irradiates a reference beam R to a reproduction recording region and a peripheral recording region around the reproduction recording area. With the irradiation of the reference beam R to the optical information recording medium 1, a reproduction beam Pd is reproduced from the reproduction recording region and a peripheral beam Pn is reproduced from the peripheral recording region. The reproduction beam Pd and the peripheral beam Pn may have P polarization. The reproduction beam Pd and the peripheral beam Pn having the P polarization travels to the peripheral beam detecting unit 200.

The peripheral beam detecting unit 200 includes a polarizer beam splitter 240, a beam splitter 260, a λ/4 wave plate 260, and a peripheral beam detector 270. The peripheral beam detecting unit 200 further includes a first lens 210, a second lens 220, and a third lens 230.

The second lens 220 and the third lens 230 have the same focal length "f." A distance between the first lens 210 and the second lens 220 is set to "2f."

The reproduction beam Pd and the peripheral beam Pn emitted from the optical information recording medium 1 travels to the polarizer beam splitter 240 through the first lens 210. The polarizer beam splitter 240 transmits the reproduction beam Pd and the peripheral beam Pn traveling from the first lens 210 to the second lens 220.

The polarizer beam splitter 240 has a beam splitting plane 241. The beam splitting plane 241 transmits a beam having P polarization and reflects a beam having S polarization. Accordingly, the reproduction beam Pd and the peripheral beam Pn traveling from the first lens 210 travels to the second lens 220.

The beam splitter 260 is disposed at a position apart by the focal length "f" from the second lens 220. The λ/4 wave plate 250 is disposed between the second lens 220 and the beam splitter 260. Accordingly, the reproduction beam Pd and the peripheral beam Pn passing through the second lens 220 travel to the beam splitter 260 through the λ/4 wave plate 250. At this time, the reproduction beam Pd and the peripheral beam Pn are focused on a position at which the beam splitter 250 is disposed. That is, the reproduction beam Pd and the peripheral beam Pn has the least size at the position of the beam splitter 260.

Figure 2:
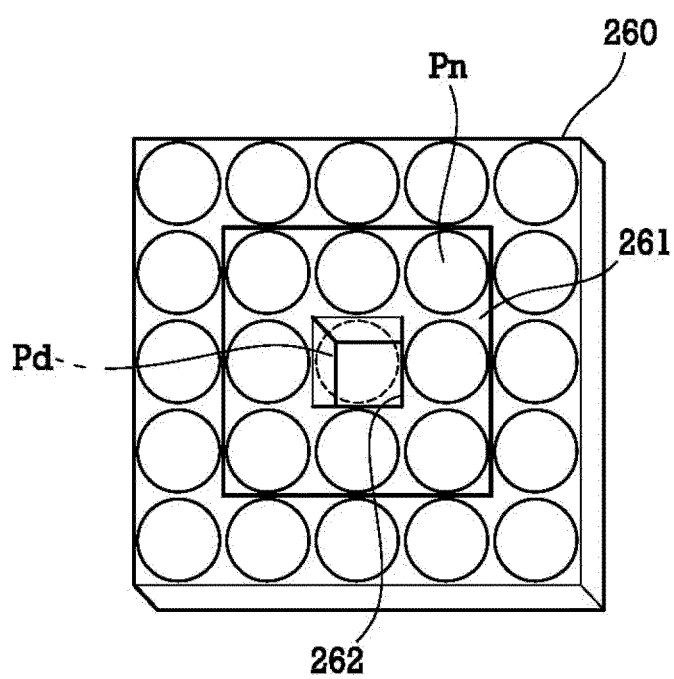
FIG. 2 is a perspective view illustrating a structure of a beam splitter illustrated in FIG. 1.

FIG. 2 is a perspective view illustrating a structure of the beam splitter 260 shown in FIG. 1.

Referring to FIGS. 1 and 2, the beam splitter 60 has a plate-shaped body. A through hole 262 transmitting only the reproduction beam Pd is formed at the center of the beam splitter 260.

The reproduction beam Pd passes through the beam splitter 260 through the through hole 260 and then travels to the reproduction beam detecting unit 400. The reproduction beam detecting unit 400 detects the optical information of the reproduction beam Pd. Accordingly, it is possible to reproduce the information contained in the reproduction beam Pd by the use of the detected optical information.

On the other hand, a reflecting film 261 having a predetermined size is formed on the surface of the beam splitter 260 opposed to the λ/4 wave plate 250. The reflecting film 261 can be formed by coating the body surface with a material capable of reflecting a beam.

The reflecting film 261 serves to reflect only the peripheral beam Pn other than the reproduction beam Pd among the reproduction beam Pd and the peripheral beam Pn traveling through the second lens 220 to the λ/4 wave plate 250. For example, as shown in FIG. 2, the reflecting film 261 can reflect 8 peripheral beams Pn other than the reproduction beam Pd among a plurality of reproduction beams Pd and peripheral beams Pd.

Only the reproduction beam Pd is selectively transmitted to the reproduction beam detecting unit 400 by the beam splitter 260 and the other peripheral beams Pn are reflected to the λ/4 wave plate 250.

On the other hand, the peripheral beam Pn traveling to the λ/4 wave plate 250 is changed to an S polarized beam. That is, the peripheral beam Pn having traveled through the λ/4 wave plate 250 is reflected and travels again through the λ/4 wave plate 250, whereby the polarization direction is changed.

The peripheral beam Pn changed to the S polarized beam is transmitted to the polarizer beam splitter 240 through the second lens 220. At this time, since the beam splitting plane 241 of the polarizer beam splitter 240 transmits a P polarized beam and reflects an S polarized beam, the peripheral beam Pn changed to the S polarized beam is reflected to the third lens 230.

The peripheral beam Pn traveling to the third lens 230 is focused on the peripheral beam detector 270 disposed at a position apart by the focal length "f' therefrom." At this time, "f'" is a value which can be appropriately selected depending on the environment. "f'" may be equal to "f."

The peripheral beam detector 270 detects the optical information of the peripheral beam Pn traveling from the third lens 230. At this time, the peripheral beam detector 270 can detect the optical information of the peripheral beam Pn by the use of divided optical detection areas. The peripheral beam detector 270 can be embodied by providing photodiodes which are beam detecting elements. The structure of the peripheral beam detector 270 will be described in detail later.

The tracking servo unit 300 includes a tracking position determining section 310, a tracking position controller 320, and a tracking position adjusting section 330.

The tracking position determining section 310 monitors the optical information of the peripheral beam Pn detected by the peripheral beam detector 270 and determines a current tracking state. The tracking position determining section 310 determines the tracking state by the use of the beam intensity of the peripheral beams Pn detected from the divided optical detection areas of the peripheral beam detector 270.

The tracking position controller 320 outputs a control signal to the tracking position adjusting section 330 in consideration of the tracking position determined by the tracking position determining section 310. The tracking position adjusting section 330 serves to adjust the position of the peripheral beam detecting unit 200 in response to the control signal, that is, to adjust the tracking position.

The reproduction beam detecting unit 400 detects the reproduction beam Pd passing through the peripheral beam detecting unit 200 in a state where the position of the peripheral beam detecting unit 200 is controlled by the tracking servo unit 300.

Another example of the optical information reproducing apparatus will be now described with reference to FIG. 3. Here, another example of the optical information reproducing apparatus has a structure similar to that of the above-mentioned example of the optical information reproducing apparatus. Accordingly, elements similar to those of the example are denoted by the same reference numerals and detailed description thereof is omitted.

Figure 3:
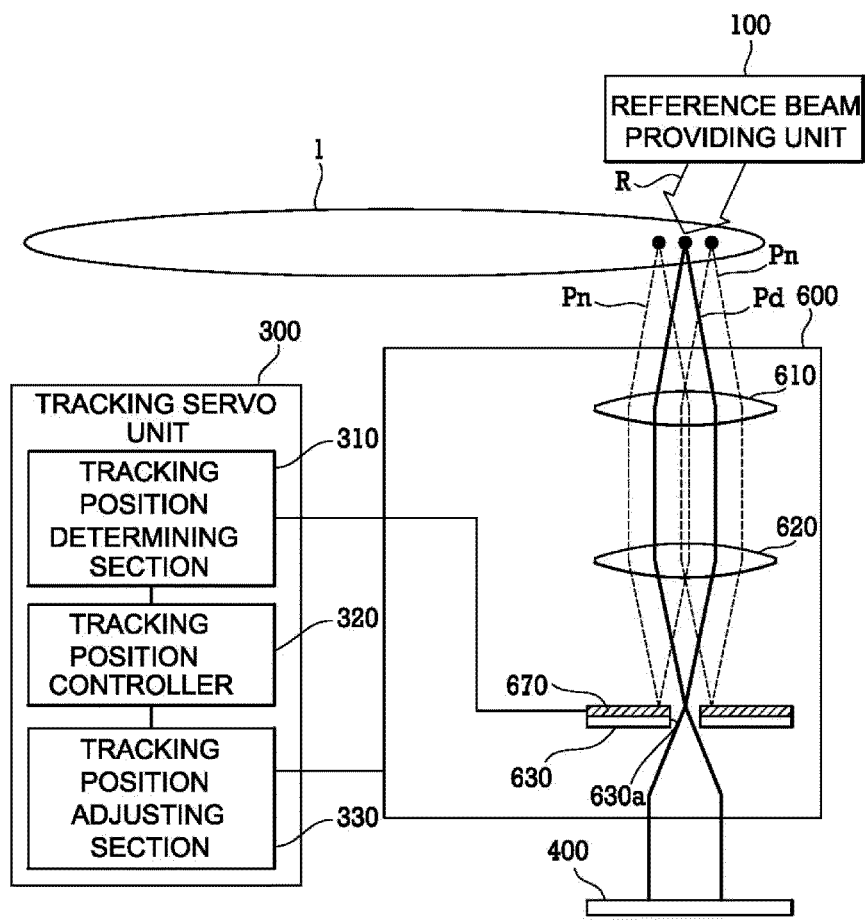
FIG. 3 is a diagram illustrating a configuration of an optical information reproducing apparatus according to another exemplary embodiment of the invention.

FIG. 3 is a diagram illustrating a configuration of an optical information reproducing apparatus according to another exemplary embodiment of the invention.

As shown in FIG. 3, the optical information reproducing apparatus includes a reference beam providing unit 100, a peripheral beam detecting unit 200, a tracking servo unit 300, and a peripheral beam detecting unit 400. The peripheral beam detecting unit 600 includes a beam splitter 630 and a peripheral beam detector 670. The peripheral beam detecting unit 600 further includes a first lens 610 and a second lens 620.

When a reference beam R is incident on the optical information recording medium 1 by the reference beam providing unit 100, a reference beam Pd and a peripheral beam Pn are emitted.

The reproduction beam Pd and the peripheral beam Pn travel in parallel through the first lens 610 and are focused on the beam splitter 630 while passing through the second lens 620. The reproduction beam Pd containing optical information to be detected passes through a through hole 630a formed at the center of the beam splitter 630 and travels to the reproduction beam detecting unit 400. The reproduction beam detecting unit 400 detects the optical information of the reproduction beam Pd. It is possible to reproduce the data contained in the reproduction beam Pd by the use of the detected optical information.

The peripheral beam detector 670 is disposed on a surface of the beam splitter 630 opposed to the second lens 620. The peripheral beam detector 670 can be embodied by providing photodiodes which are beam detecting elements.

The peripheral beam detector 670 detects at least one peripheral beam Pn traveling from the second lens 620. The peripheral beam detector 670 can detect the peripheral beam Pn by the use of divided optical detection areas.

A servo operation of the optical information reproducing apparatus will be now described. Here, the tracking servo operations of the optical information reproducing apparatuses according to the exemplary embodiment and the another exemplary embodiment of the invention are similar to each other. Accordingly, the tracking servo operation will be described with reference to the exemplary embodiment of the invention.

Figure 4:
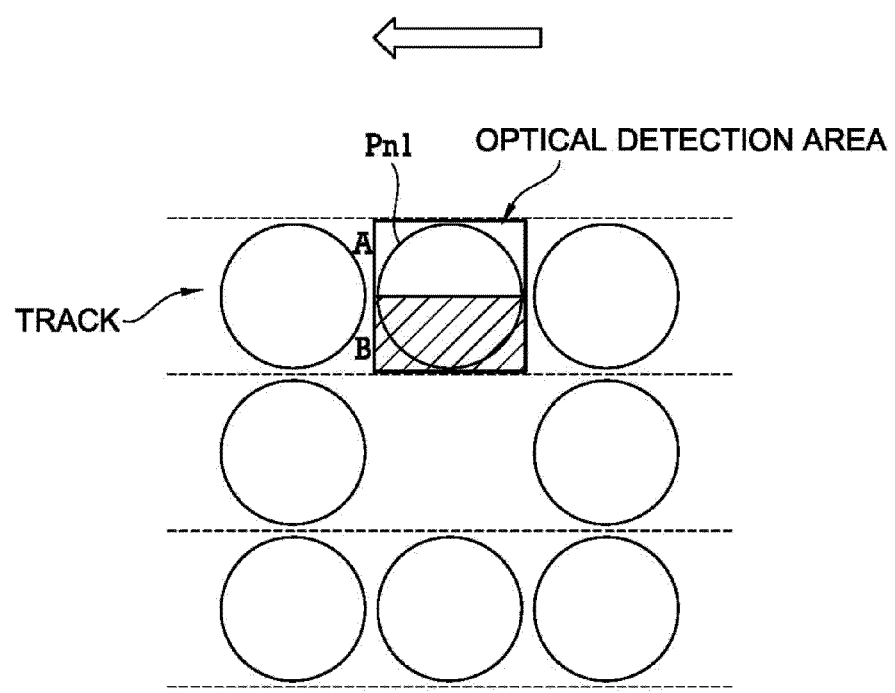
FIG. 4 is a diagram illustrating a beam detecting process in a peripheral beam detector of a reproduction beam processor illustrated in FIG. 2.

FIG. 4 is a diagram illustrating an example where the peripheral beam detector 270 of the reproduction beam processing unit 200 according to the exemplary embodiment of the invention detects the optical information. Here, one peripheral beam spot image Pn1 is accurately detected by the peripheral beam detector 270 when the tracking position is on track.

As described in FIG. 4, the peripheral beam detector 270 have optical detection areas having a size which can completely detect a spot image Pn1 among 8 spot images of the incident peripheral beams. The optical detection area can be divided into optical detection area A and optical detection area B. That is, the peripheral beam detector 270 can employ a two-division beam splitter.

In the example shown in FIG. 4, since the tracking state is good, the spot image Pn1 of one peripheral beam is completely detected from the optical detection area. Accordingly, halves of the spot image Pn1 of the corresponding peripheral beam are detected from optical detection area A and optical detection area B, respectively. That is, when the tracking position is on track, the beam intensity detected from optical detection area A is equal to the beam intensity detected from optical detection area B.

Figure 5:
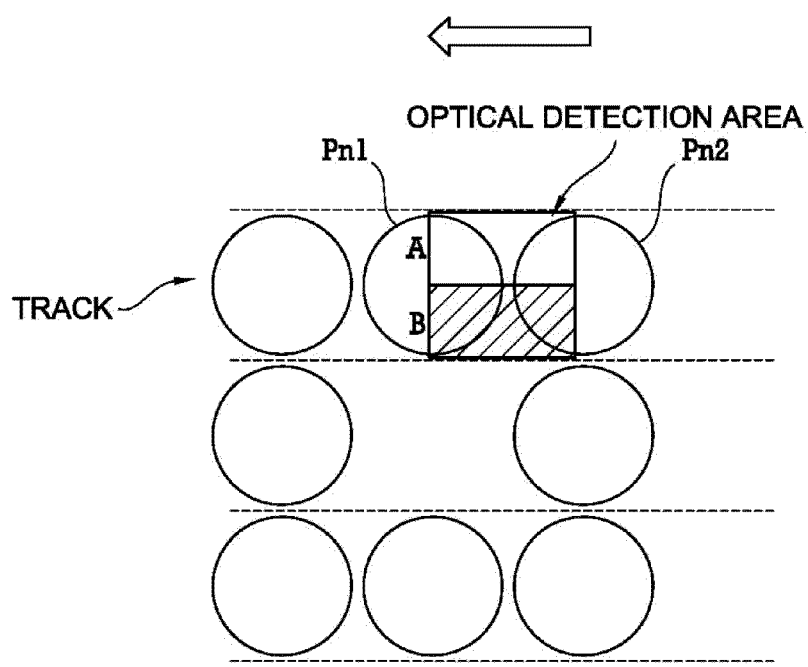
FIG. 5 is a diagram illustrating an example of an image detected from an optical detection area when an optical information recording medium moves by a predetermined distance in the example illustrated in FIG. 4.

FIG. 5 is a diagram illustrating an image detected from the optical detection area when the optical information recording medium moves by a predetermined distance in the example shown in FIG. 4.

Here, the movement indicates a rotation of the optical information recording medium 1. Since the actual spot images Pn1 and Pn2 of the peripheral beam are still smaller than the rotation radius of the optical information recording medium 1, the spot images Pn1 and Pn2 of the peripheral beam can be considered as moving horizontally at the time of detecting the optical information. When it is assumed that the optical information recording medium 1 rotates in the counterclockwise direction, it can be considered that the spot images Pn1 and Pn2 of the peripheral beam moves to left. Accordingly, the arrow shown in the upside of FIG. 5 indicates the movement direction of the optical information recording medium 1.

Referring to FIG. 5, the optical information recording medium 1 rotates slightly and halves of two spot images Pn1 and Pn2 of two peripheral beams are included in the optical detection area. Accordingly, the beam intensity detected from the optical detection area is smaller than the beam intensity detected in FIG. 4 due to the distance between two spot images.

However, the beam intensity detected from optical detection area A is equal to the beam intensity detected from optical detection area B. That is, when the tracking position is on track, the beam intensity detected from optical detection area A is equal to the beam intensity detected from optical detection area B regardless of the rotation of the optical information recording medium 1.

Figure 6:
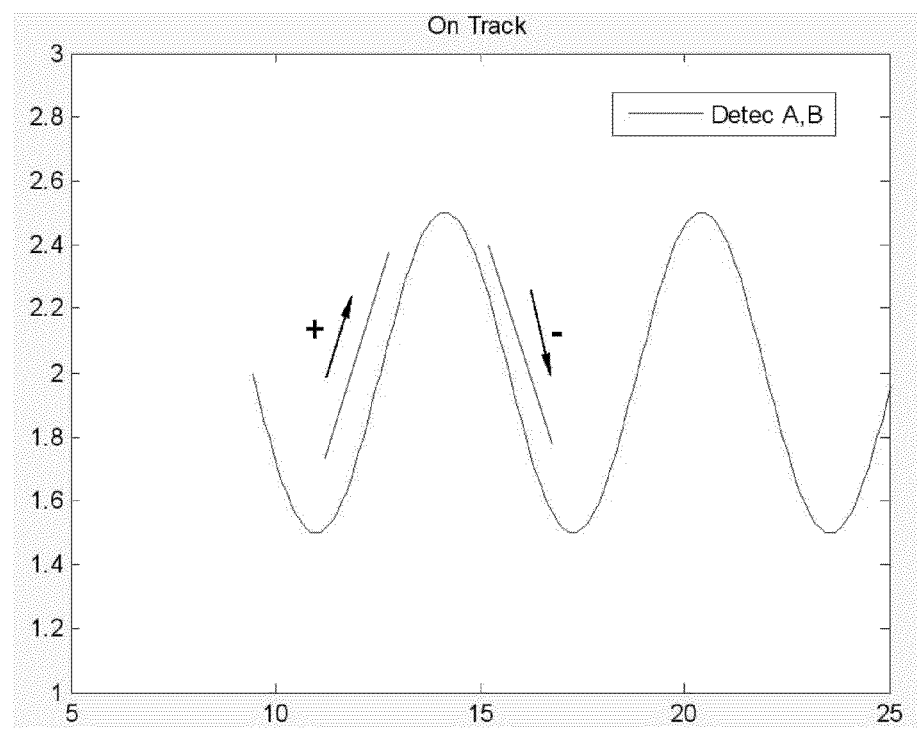
FIG. 6 is a graph illustrating a beam intensity distribution detected from optical detection area A and optical detection area B with a rotation of the optical information recording medium when a tracking operation is normal.

FIG. 6 is a graph illustrating the beam intensity of optical detection area A and the beam intensity detected from optical detection area B with the rotation of the optical information recording medium when the tracking position is normal. In the graph shown in FIG. 6, the Y axis denotes the beam intensity and the X axis denotes the time.

As shown in FIG. 6, when the tracking position is on track, the beam intensity detected from optical detection area A and the beam intensity detected from optical detection area B repeatedly increases and decreases. That is, as shown in FIG. 4, when the spot image Pn1 of the peripheral beam is completely included in the optical detection area, the beam intensity is largest and as shown in FIG. 5, when halves of the spot images Pn1 and Pn2 of two peripheral beams are included in the optical detection area, the beam intensity is smallest.

However, it can be seen from the graph shown in FIG. 6 that the beam intensity detected from optical detection area A is always equal to the beam intensity detected from optical detection area B regardless of the rotation of the optical information recording medium 1 when the tracking position is on track.

Figure 7:
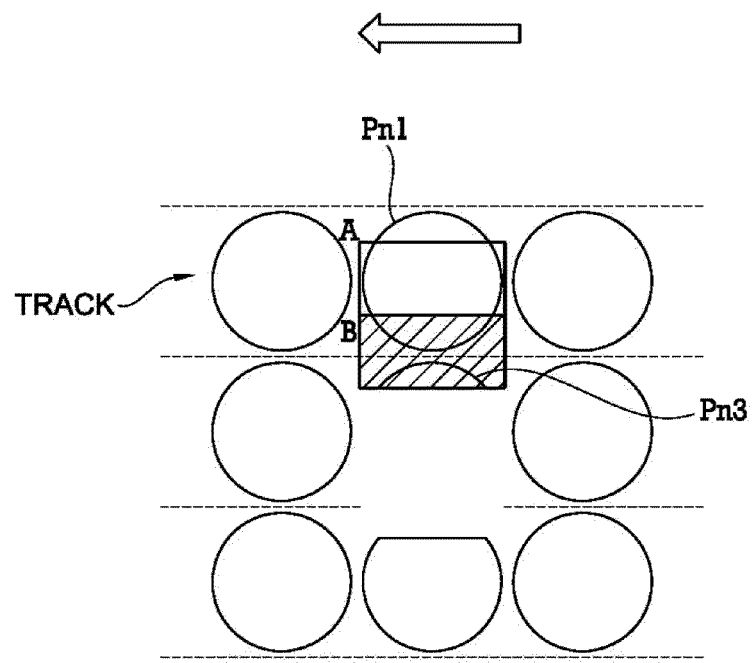
FIG. 7 is a diagram illustrating an example of an image detected by the peripheral beam detector when a tracking position moves upward from a normal position.

FIG. 7 is a diagram illustrating an example of an image detected by the peripheral beam detector when the tracking position moves upward from a normal position.

Referring to FIG. 7, it can be seen that the tracking position moves upward from the normal position and the beam intensity detected from optical detection area A is larger than the beam intensity detected from optical detection area B. This is because the central portion of the spot image Pn 1 is detected from optical detection area A and a part of the spot image Pn1 and a part of the reproduction beam Pn3 on the lower track are detected from optical detection area B.

Accordingly, when the beam intensity detected from optical detection area A is larger than the beam intensity detected from optical detection area B, the tracking servo controller 500 is controlled to move the peripheral beam detecting unit 200 so that the tracking position moves downward.

With the same concept, when the beam intensity detected from optical detection area B is larger than the beam intensity detected from optical detection area A, the tracking position moves downward from the normal position. In this case, the peripheral beam detecting unit 200 is adjusted to move the tracking position upward.

Figure 8:
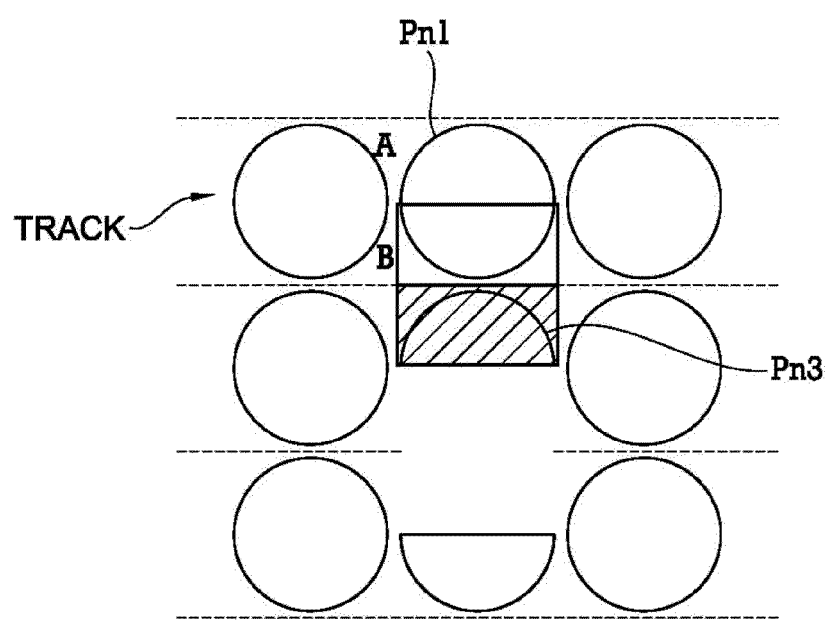
FIG. 8 is a diagram illustrating a case where the optical information recording medium moves further upward from the position illustrated in FIG. 7 and the track departs most from the normal position.

FIG. 8 is a diagram illustrating an example where the tracking position moves further downward from the position shown in FIG. 7 and the tracking position departs most from the normal position.

Referring to FIG. 8, it can be seen that the tracking position to be detected moves further upward from the position shown in FIG. 7 and the beam intensity detected from optical detection area A is equal to the beam intensity detected from optical detection area B.

In this case, since the beam intensity of optical detection area A is equal to the beam intensity of optical detection area B, it is similar to the case shown in FIG. 4. However, even when the beam intensity of optical detection area A is equal to the beam intensity of optical detection area B, it is possible to distinguish the case where the tracking position is normal from the case where the tracking position departs most, by monitoring the tracking positions before and after.

Figure 9:
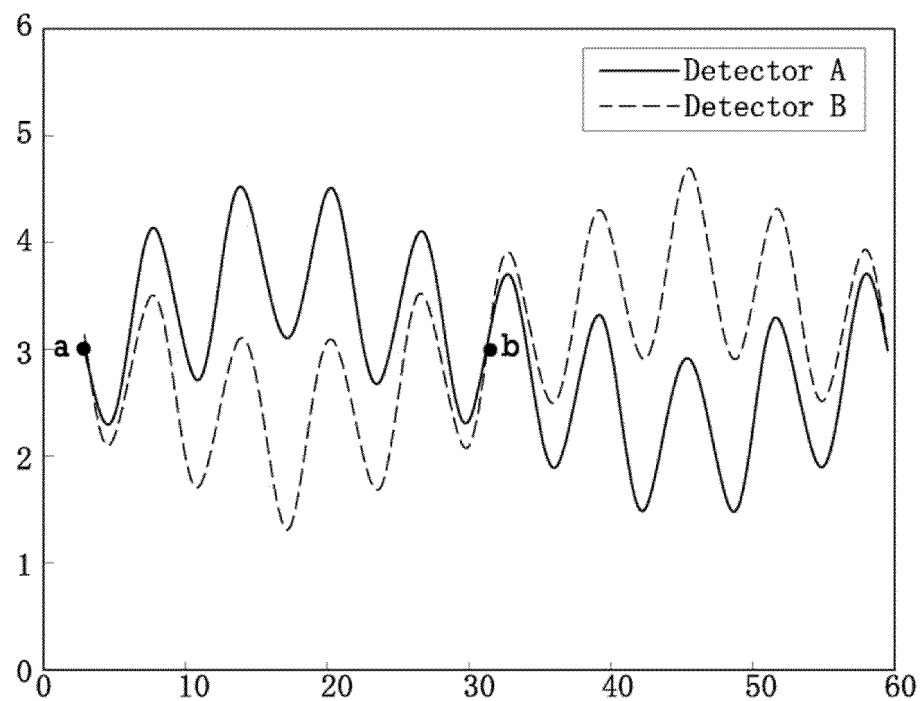
FIG. 9 is a graph illustrating a variation in beam intensity in optical detection area A and optical detection area B when the track slowly moves upward from the normal position.

FIG. 9 is a graph illustrating variations of beam intensity of optical detection area A and optical detection area B when the tracking position slowly moves upward from the normal position. In the graph shown in FIG. 9, the Y axis denotes the beam intensity and the X axis denotes the time.

Referring to FIG. 9, the beam intensity of optical detection area A is equal to the beam intensity of optical detection area B at point "a", which means that the tracking position is normal. However, after point "a", the beam intensity of optical detection area A is larger than the beam intensity of optical detection area B. That is, it means that the tracking position moves upward.

On the other hand, with the upward movement of the tracking position, the beam intensity of optical detection area A is equal again to the beam intensity of optical detection area B at point "b." This case is shown in FIG. 8. That is, it means a case where the tracking position departs most upward.

Point "a" and point "b" can be distinguished from each other by monitoring the beam intensity distribution before and after. That is, before point "b", the beam intensity of optical detection area A is larger than the beam intensity of optical detection area B and after point "b", the beam intensity of optical detection area A is smaller than the beam intensity of optical area B. Accordingly, at the point at which the beam intensities are equal to each other and which is located between the point where the beam intensity of optical detection area A is larger than the beam intensity of optical detection area B and the point where the beam intensity of optical detection area A is smaller than the beam intensity of optical detection area B, it can be determined that the tracking position moves upward as shown in FIG. 8. As a result, the tracking position can be adjusted downward by the tracking servo unit 500.

Figure 10:
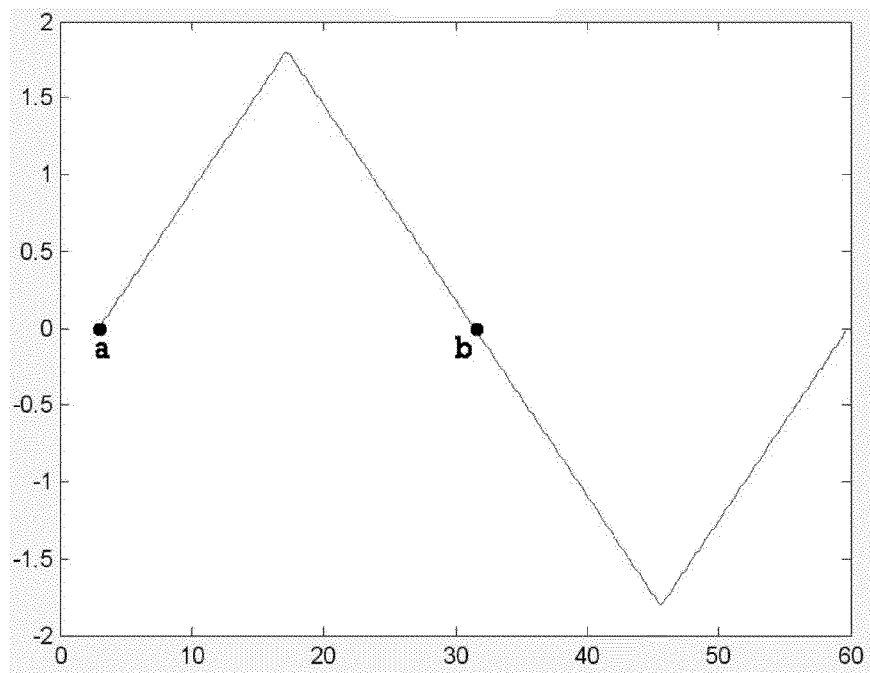
FIG. 10 is a graph illustrating a variation of a difference in beam intensity between the optical detection area A and the optical detection area B.

FIG. 10 is a graph illustrating a variation in difference between the beam intensity of optical detection area A and the beam intensity of optical detection area B, in which the graph shows a difference between optical detection area A and optical detection area B with the variation in beam intensity shown in FIG. 9.

Referring to FIG. 10, at point "a", since the beam intensity of optical detection area A is equal to the beam intensity of optical detection area B, the difference in beam intensity is "0." That is, this means a case where the tracking position is normal.

Thereafter, with the upward movement of the tracking position, the difference in beam intensity between optical detection area A and optical detection area B increases and then decreases and becomes zero at point "b." However, since point "b" is a point where the beam intensities are equal to each other before and after the difference in beam intensity decreases as described above, this point means the state where the tracking position moves upward as shown in FIG. 8 in consideration of the before and after states. Accordingly, the tracking position should be adjusted downward.

In this way, it is possible to determine the current tracking state by monitoring the beam intensity distributions of optical detection area A and optical detection area B and to adjust the tracking state by controlling the tracking servo unit 300 accordingly. The determination and control operations can be carried out by the tracking position determining section 310, the tracking position controller 320, and the tracking position adjusting section 330.

On the other hand, it has been shown in FIGS. 4 to 8 that the peripheral beam detector 270 includes one two-division beam detector having optical detection area A and optical detection area B. However, depending on the environments, the peripheral beam detector 270 may include a plurality of two-division beam detector or a beam detector having three or more optical detection areas.

Figure 11:
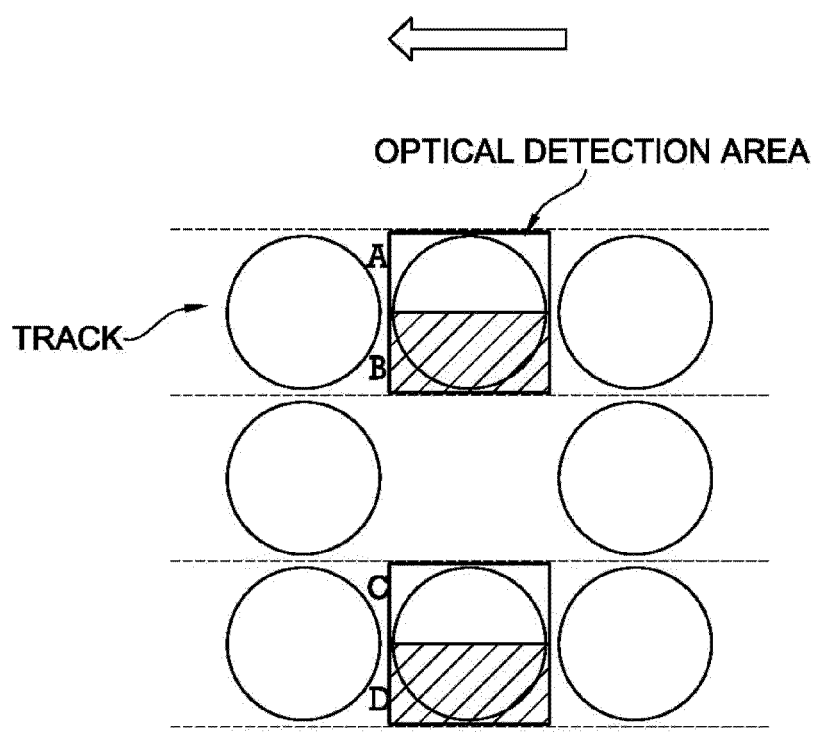
FIG. 11 is a diagram illustrating an example for detecting a beam intensity distribution of a peripheral spot image with four optical detection areas.

FIG. 11 is a diagram illustrating an example for detecting a beam intensity distribution of a spot image of a peripheral beam with four optical detection areas.

Referring to FIG. 11, the beam detector has four optical detection areas of optical detection area A, optical detection area B, optical detection area C, and optical detection area D. That is, the peripheral beam detector 270 includes two two-division beam detectors.

In this case, it is also possible to determine the tracking position in consideration of the difference in beam intensity between optical detection area A and optical detection area B and the difference in beam intensity between optical detection area C and optical detection area D. For example, it is possible to determine the tracking state by averaging the difference in beam intensity between optical detection area A and optical detection area B and the difference in beam intensity between optical detection area C and optical detection area D.

By employing such an optical detection structure, it is possible to determine the start or end of a track of the optical information recording medium 1.

That is, when there is little difference between the sum of beam intensity of optical detection area A and optical detection area B and the sum of beam intensity of optical detection area C and the optical detection area D, the current track can be determined as being an intermediate track other than the start track and the end track of the optical information recording medium 1. This is because the intermediate tracks exhibit a relative constant beam intensity.

On the other hand, when there is a large difference between the sum of beam intensity of optical detection area A and optical detection area B and the sum of beam intensity of optical detection area C and the optical detection area D for a constant time, the current track can be determined as being the start track or end track of the optical information recording medium 1. This is because no optical information is detected from the track right before or after the start track or the end track.

Therefore, by employing a plurality of two-division beam detectors, it is possible to detect the start track and the end track as well as to precisely determine the tracking state.

FIG. 12 is a flowchart illustrating an optical information reproducing method according to an exemplary embodiment of the invention. The optical information reproducing method shown in FIG. 12 can be carried out by the above-mentioned optical information reproducing apparatus.

Referring to FIG. 12, first, the optical information of the peripheral beam Pn should be acquired to obtain the current tracking information. Accordingly, the reference beam providing unit 100 inputs a reference beam R to the reproduction recording area and the peripheral recording area of the optical information recording medium 1 (step S10).

At this time, in response to the reference beam R, a reproduction beam Pd is reproduced from the reproduction recording area and a peripheral beam Pn is reproduced from the peripheral recording area.

At this time, the optical information of the peripheral beam Pn can be detected by the use of the divided optical detection areas of the peripheral beam detecting unit 200. For example, as described above, the optical information of one peripheral beam Pn is detected from two optical detection areas. The optical information of two peripheral beams Pn may be detected from two optical detection areas, respectively. In this case, the start track and the end track can be identified. Here, the two peripheral beams Pn mean beams reproduced from spots in the tracks before and after the current track (step S20).

The optical information of the detected peripheral beam Pn is analyzed, the current tracking state is determined, and it is judged whether the tracking servo control is necessary. Here, when it is judged that the tracking servo control is necessary, the tracking position is adjusted in consideration of the current tracking position and when it is judged that the tracking servo control is not necessary, the current tracking state is maintained.

For example, when there is no difference in beam intensity between two optical detection areas, the current tracking state is maintained, and when there is a difference in beam intensity therebetween, the tracking servo control is performed in consideration of the current tracking position. That is, the tracking adjustment is performed.

For example, when the tracking position moves upward from the normal position, the tracking position is shifted under the tracking servo control and when the tracking position moves downward from the normal position, the tracking position is shifted downward under the tracking servo control.

In this way, by adjusting the tracking position, detecting the optical information of the reproduction beam reproduced in a normal tracking state, and restoring data contained in the reproduction beam, it is possible to acquire the optical information of a desired recording area (step S40).

According to the invention described above, it is possible to determine a current tracking state by the use of a peripheral beam at the time of reproducing optical information and to perform a tracking servo control by the use of the determination result. Accordingly, it is possible to efficiently perform the tracking servo control with a simple structure and to enhance reliability of reproduced data by reducing a bit error rate through the tracking servo control.

What is claimed is:

1. An optical information reproducing apparatus comprising:
   a reference beam providing unit configured to input a reference beam to a reproduction recording area and a peripheral recording area around the reproduction recording area on an optical information recording medium that rotates;
   a peripheral beam detecting unit configured to pass a reproduction beam reproduced from the reproduction recording area in response to the reference beam and to detect a peripheral beam which is reproduced from an interference pattern by inputting the reference beam to the peripheral recording area;

a tracking servo unit configured to analyze optical information of the detected peripheral beam and to maintain a normal tracking position; and a reproduction beam detecting unit configured to detect the reproduction beam which passed through the peripheral beam detecting unit, wherein the peripheral beam detecting unit is configured to separate the peripheral beam from the reproduction beam and the peripheral beam reproduced from the optical information recording medium and comprises:

a peripheral beam detector configured to detect the peripheral beam using a beam intensity detection area comprising a first detection area and a second detection area, wherein at the normal tracking position, the beam intensity detected from the first detection area and the beam intensity detected from the second detection area repeatedly increase and decrease with the rotations of the optical information recording medium such that the beam intensity detected from the first detection area is equal to the beam intensity detected from the second detection area regardless of the rotation of the optical information recording medium, wherein the beam intensity detected from the first detection area and the beam intensity detected from the second detection area are monitored by the tracking servo unit at a current tracking position to determine a current tracking state;

wherein the current tracking position is adjusted by the tracking servo unit based on the beam intensities as well as a difference in beam intensities of states before and after the current tracking state, and wherein the peripheral beam detecting unit further comprises:

a polarizer beam splitter disposed between the optical information recording medium and another beam splitter;

a wave plate disposed between the polarizer beam splitter and said other beam splitter; and a reflecting film which reflects the peripheral beam to said polarizer beam splitter, wherein the peripheral beam detector is disposed in an optical path of the peripheral beam which is separated from the reproduction beam by said other beam splitter and then is reflected by said polarizer beam splitter.

2. The optical information reproducing apparatus according to claim 1, wherein when the beam intensity detected from the first detection area is larger than the beam intensity detected from the second detection area, the tracking position is moved in one direction, and wherein when the beam intensity detected from the second detection area is larger than the beam intensity detected from the first detection area, the tracking position is moved in another direction.

3. The optical information reproducing apparatus according to claim 1, wherein when the beam intensity detected from the first detection area is larger than the beam intensity detected from the second detection area and then becomes smaller than the beam intensity detected from the second detection area, the tracking position is moved in one direction causing the beam intensity detected from the first detection area to become larger than the beam intensity detected from the second detection area, and when the beam intensity detected from the second detection area is larger than the beam intensity detected from the first detection area and then becomes smaller than the beam intensity detected from the first detection area, the tracking position is moved in one direction causing the beam intensity detected from the second detection area to become larger than the beam intensity detected from the first detection area.

4. An optical information reproducing apparatus comprising:

a reference beam providing unit configured to input a reference beam to a reproduction recording area and a peripheral recording area around the reproduction recording area on an optical information recording medium;

a peripheral beam detecting unit configured to pass a reproduction beam reproduced from the reproduction recording area in response to the reference beam and to detect a peripheral beam which is reproduced from an interference pattern by inputting the reference beam to the peripheral recording area;

a tracking servo unit configured to analyze optical information of the detected peripheral beam and to maintain a normal tracking position; and a reproduction beam detecting unit configured to detect the reproduction beam which passed through the peripheral beam detecting unit, wherein the peripheral beam detecting unit is configured to separate the peripheral beam from the reproduction beam and the peripheral beam reproduced from the optical information recording medium and comprises:

a peripheral beam detector configured to detect the peripheral beam using a beam intensity detection area comprising a first detection area and a second detection area, wherein at the normal tracking position the beam intensity detected from the first detection area is equal to the beam intensity detected from the second detection area, wherein the beam intensity detected from the first detection area and the beam intensity detected from the second detection area are monitored by the tracking servo unit at a current tracking position to determine a current tracking state;

wherein the current tracking position is adjusted by the tracking servo unit based on the beam intensities as well as a difference in beam intensities of states before and after the current tracking state; and wherein the peripheral beam detecting unit further comprises:

a polarizer beam splitter disposed between the optical information recording medium and another beam splitter;

a wave plate disposed between the polarizer beam splitter and said other beam splitter; and a reflecting film which reflects the peripheral beam to the polarizer beam splitter, wherein the peripheral beam detector is disposed in an optical path of the peripheral beam which is separated from the reproduction beam by said other beam splitter and then is reflected by the polarizer beam splitter.

5. The optical information reproducing apparatus according to claim 4, wherein when the beam intensity detected from the first detection area is larger than the beam intensity detected from the second detection area, the tracking position is moved in one direction, and wherein when the beam intensity detected from the second detection area is larger than the beam intensity detected from the first detection area, the tracking position is moved in another direction.

6. The optical information reproducing apparatus according to claim 4, wherein when the beam intensity detected from the first detection area is larger than the beam intensity detected from the second detection area and then becomes smaller than the beam intensity detected from the second detection area, the tracking position is moved in one direction causing the beam intensity detected from the first detection area to become larger than the beam intensity detected from the second detection area, and when the beam intensity detected from the second detection area is larger than the beam intensity detected from the first detection area and then becomes smaller than the beam intensity detected from the first detection area, the tracking position is moved in one direction causing the beam intensity detected from the second detection area to become larger than the beam intensity detected from the first detection area.

* * * * *